Sept. 13, 1949.    B. O. LUTON    2,481,764
HAND TOOL FOR LOOSENING AND FORCING
TIRE BEADS INTO RIM CENTERS
Filed Sept. 23, 1946
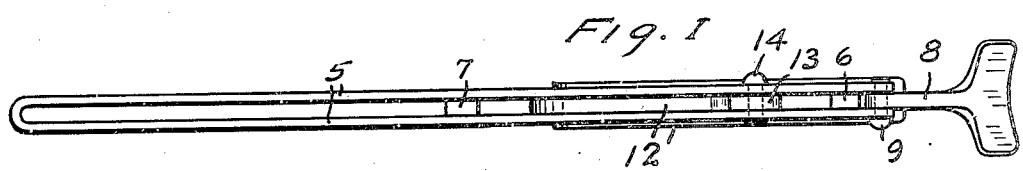
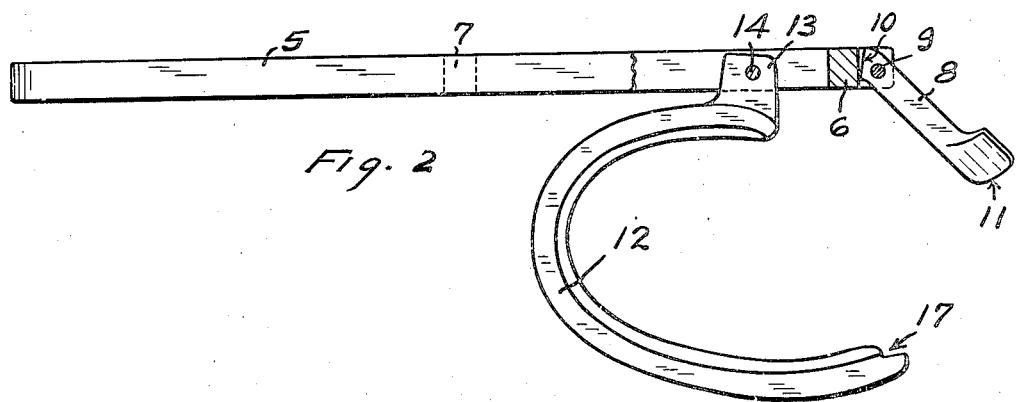
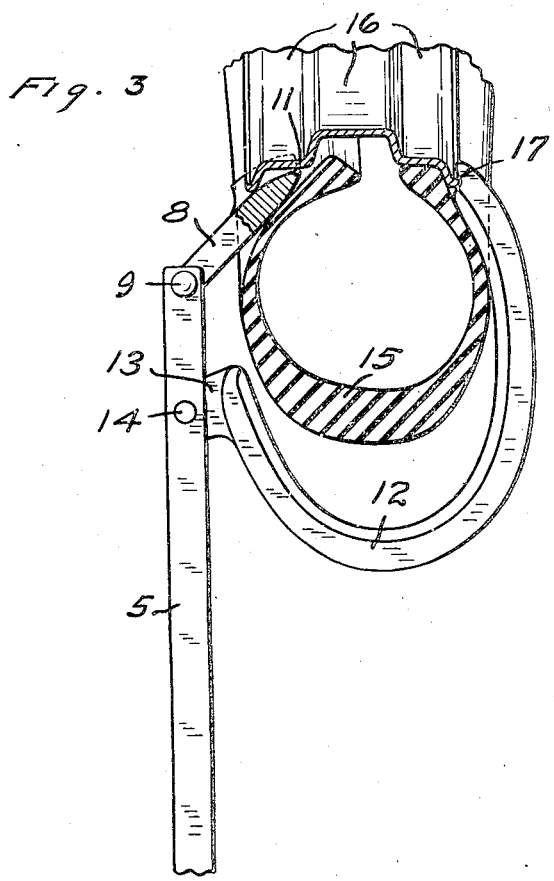
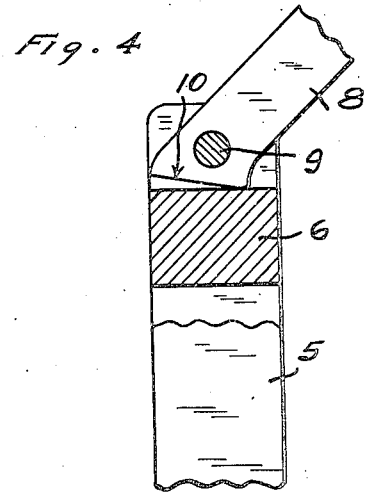
INVENTOR
Bradley O. Luton
BY
Fred C. Matheny
ATTORNEY Patented Sept. 13, 1949

2,481,764

UNITED STATES PATENT OFFICE 2,481,764

HAND TOOL FOR LOOSENING AND FORCING TIRE BEADS INTO RIM CENTERS

Bradley O. Luton, Tacoma, Wash.

Application September 23, 1946, Serial No. 698,783

1 Claim. (Cl. 157—1.26)

This invention relates to a tire tool and an object of this invention is to provide a simple and efficient tire tool that will facilitate loosening the bead portions of a tire on a drop center rim and pushing these bead portions inwardly into the depressed center of the rim without removing the rim or wheel from the vehicle on which the tire is mounted.

When pneumatic tires are used on drop center rims the bead portions of the tires will often bind so tightly on the marginal portions of the rims that it is difficult to loosen these bead portions and move them inwardly into the drop center part of the rim to allow the tire to be removed. It is common practice to remove the rim or wheel from the vehicle before removing a tire from a drop center rim. This removal of the rim or wheel from the vehicle and subsequent removal of the tire from the rim takes considerable time and requires considerable labor.

It is an object of this invention to provide a tool that can be used to quickly and easily loosen a tire on a drop center rim by jacking up a wheel of a vehicle and applying the tool, thus permitting a tire to be easily removed from a rim without taking the rim off of the vehicle.

It is another object of this invention to provide a tire tool of this nature that is simple and durable in construction, not expensive to manufacture and relatively easy to operate.

It is a further object of this invention to provide a tire tool comprising a handle member in the form of a lever arm, a tire bead engaging member carried by the inner end portion of said lever arm, and a hook shaped arch member pivotally connected with said lever arm and adapted to extend over and around a tire and engage with a rim and serve as a fulcrum member for the lever arm.

Other objects of this invention will be apparent from the following description taken in connection with the accompanying drawings.

In the drawings Figure 1 is a back edge view of a tire tool constructed in accordance with this invention.

Fig. 2 is a side view of the same, with parts broken away and parts shown in section.

Fig. 3 is a view partly in section and partly in elevation showing this tire tool in an operative position as it may appear when in use for loosening a tire on a drop center rim.

Fig. 4 is a fragmentary view partly in section and partly in elevation on a larger scale than the other views showing the manner of mounting a tire bead engaging member on a lever arm.

Like reference numerals designate like parts throughout the several views.

This tool comprises a lever arm or handle 5, preferably about two feet long and formed of a flat piece of metal bent double. The two sides of the lever arm or handle 5 are spaced apart and have spacer members 6 and 7 interposed therebetween and preferably welded thereto.

A tire bead engaging member 8 preferably of T shape, is connected by a pivot 9 with an end portion of the handle member 5. Preferably the pivoted end portion of the T-shaped tire bead engaging member 8 has a flattened foot portion 10 that is adapted to engage with and bump against the adjacent fixed spacer member 6. The foot portion 10 and spacer member 6 cooperate to position the T member 8 and to limit the angular movement of said T member 8. Preferably the T member 8 has an angular movement of from five to ten degrees and said T member extends generally at an angle of about forty-five degrees from the lever arm or handle 5.

The outer end or cross arm portion of the T member 8 tapers to a blunt edge 11 that is sharp enough to wedge between a tire 15 and a rim 16 and blunt enough so that there will be no danger that it will cut the bead portion of a tire. Preferably the outer end portion of the T member 8 is curved to conform to the peripheral curvature of a rim 16.

A relatively strong hook shaped arch member or fulcrum member 12 is provided with a flange 13 that is connected by a pivot member 14 with the handle 5, a short distance to the rear of the pivot member 9. In practice I find it satisfactory to space the pivot members 9 and 14 about three inches apart. The arch member 12 may be of T-shaped cross section as shown in Figs. 2 and 3.

The arch member 12 is adapted to hook over and around a tire 15 that is to be removed from a drop center rim 16 and the end portion of said arch member has an L-shaped notch 17 adapted to fit over and engage with the edge portion of the rim 16.

The arch member 12 is strong and substantial and is used as a fulcrum member for the handle or lever 5. The inside clearance between the two extremities of this arch member is preferably about seven inches. With an arch member shaped as shown and having this clearance I find that this tool can be successfully used on tires ranging in size from three and one-half to seven and one-half inches in diameter.

In the operation of this tire tool in loosening a drop center tire on a rim the tire to be removed is deflated and raised clear of the ground. The tool is then applied by hooking the arch member 12 over the tire, as shown in Fig. 3, and positioning the edge 11 of the T member 8 against the bead portion of the tire opposite the notched end of the arch member and adjacent the periphery of the rim. The tire bead portion against which the T member 8 rests is then pushed inwardly toward the notched end of the arch member 12 into the depressed central portion of the rim 16 to the position shown in Fig. 3. This is done by using the handle 5 as a lever with the pivot 14 acting as a fulcrum, said pivot being supported from the opposite side of the rim 16 by the arch member 12.

The limited angular movement allowed to the T member 8, by the flat foot portion 10 and the fixed spacer 6, provides sufficient self adjustment of the T member 8 to insure proper operation and always holds this T member 8 in a correct position for quick and easy application to a tire.

The tool is reversible on tires and can be used for pushing the tire bead inwardly on one side for as much of the distance around the rim as is desired and then applied in the same manner to the other side of the tire.

The foregoing description clearly discloses a preferred embodiment of my invention but it will be understood that changes in the same can be made within the scope and spirit of the following claim.

I claim:

A tool for use in removing pneumatic tires from drop center rims comprising an arch member adapted to extend over and partially around the outside of a pneumatic tire and to have one portion thereof positioned in engagement with the marginal portion of a rim on which the tire is mounted; a lever arm fulcrumed intermediate its ends on the other end portion of said arch member, said lever arm having a forked inner end portion provided with a solid wall adapted to form a stop; a tire bead thrust member having one end portion positioned in the forked end portion of said lever arm; transverse pivot means extending through said forked end portion of said lever arm and the end portion of said thrust member therein pivotally connecting said lever arm and said tire bead thrust member; a stop member on the pivoted end portion of said tire bead thrust member positioned to engage with said solid wall of said lever arm to limit to a small angle the swinging movement of said tire bead thrust member relative to said lever arm and to support said tire bead thrust member in a position inclined away from the axis of said lever arm and toward said arch member; and a cross member on the end portion of said tire bead thrust member remote from said pivot means adapted to engage with the bead portion of a tire.

BRADLEY O. LUTON.

REFERENCES CITED

The following references are of record in the file of this patent:

UNITED STATES PATENTS

| Number | Name | Date |
|---|---|---|
| 840,207 | Glickert et al. | Jan. 1, 1907 |
| 933,106 | Owens | Sept. 7, 1909 |
| 1,001,670 | Morris | Aug. 29, 1911 |
| 1,317,143 | Peterson et al. | Sept. 23, 1919 |